(12) United States Patent
Norberg et al.

(10) Patent No.: US 7,736,611 B2
(45) Date of Patent: Jun. 15, 2010

(54) AGGLOMERATES OF PRECIPITATED SILICA, METHOD FOR THEIR PREPARATION AND THEIR USE AS FILTER MEDIUM FOR GAS FILTRATION

(75) Inventors: Sven-Peter Norberg, Gävle (SE); Jörgen Abrahamsson, Gävle (SE); Lars Gösta Lindahl, Söderhamn (SE)

(73) Assignee: Svenska Aerogel AB, Soderhamn (SE)

( * ) Notice: Subject to any disclaimer, the term of this patent is extended or adjusted under 35 U.S.C. 154(b) by 104 days.

(21) Appl. No.: 11/793,776

(22) PCT Filed: Dec. 23, 2005

(86) PCT No.: PCT/SE2005/002036

§ 371 (c)(1),
(2), (4) Date: Aug. 10, 2007

(87) PCT Pub. No.: WO2006/071183

PCT Pub. Date: Jul. 6, 2006

(65) Prior Publication Data

US 2008/0034968 A1    Feb. 14, 2008

(30) Foreign Application Priority Data

Dec. 27, 2004   (SE) ................................. 0403164

(51) Int. Cl.
*C01B 33/32* (2006.01)
(52) U.S. Cl. .................... 423/333; 423/330.1; 423/331; 502/407; 502/408; 502/411; 95/90

(58) Field of Classification Search ................. 423/333; 502/407; 95/90
See application file for complete search history.

(56) References Cited

U.S. PATENT DOCUMENTS

| | | | |
|---|---|---|---|
| 3,473,890 A | | 10/1969 | Reinhardt et al. |
| 3,755,183 A | | 8/1973 | Fahn et al. |
| 4,739,111 A | * | 4/1988 | Ryu ........................... 560/210 |
| 5,013,536 A | * | 5/1991 | Vaughan et al. ............. 423/705 |
| 2002/0018853 A1 | * | 2/2002 | Khare ........................ 427/387 |
| 2004/0146436 A1 | * | 7/2004 | Ham et al. .................. 422/177 |
| 2005/0224751 A1 | * | 10/2005 | DelDuca et al. ........ 252/188.28 |

FOREIGN PATENT DOCUMENTS

| | | |
|---|---|---|
| CH | 496 622 | 11/1970 |
| DE | 37 13 600 A1 | 11/1988 |
| EP | 0 476 134 A1 | 3/1992 |

* cited by examiner

*Primary Examiner*—Robert J Hill, Jr.
*Assistant Examiner*—Christopher P Jones
(74) *Attorney, Agent, or Firm*—Young & Thompson (57) ABSTRACT

A method of producing a material including agglomerated particles of precipitated silica, including preparing a solution of at least two metal salts (Me), wherein the metal ions are divalent or polyvalent. A solution of alkali metal (M) silicate having a molar ratio $SiO_2/M_2O$ of 1-4 is prepared. The solutions are mixed and the mixture stirred, allowing a coagulum to immediately form. The coagulum is rinsed, collected, dewatered, impregnated and processed to provide a material having a dry matter content of >75%, preferably >97%. A material obtainable by the process is also provided.

14 Claims, 3 Drawing Sheets

AGGLOMERATES OF PRECIPITATED SILICA, METHOD FOR THEIR PREPARATION AND THEIR USE AS FILTER MEDIUM FOR GAS FILTRATION

The present invention relates to a novel type of material and to its manufacture by a solution based process. The material is referred to as a precipitated micro-porous material or more particularly an agglomerate of precipitated silica. An important application of the novel material is as a gas filter medium, in particular it is suitable for removing $CO_2$ from atmospheres in certain environments.

BACKGROUND OF THE INVENTION

Undesirable airborne compounds, including sulfur compounds, ammonia, formaldehyde, urea, carbon monoxide, oxides of nitrogen, mercaptans, amines, and ethylene, occur in a number of environments, where most are primarily responsible for the presence of disagreeable odors, or irritating or toxic gases. Such environments include petroleum treatment and storage areas, sewage treatment facilities, hospitals, morgues, anatomy laboratories, animal rooms, and pulp and paper production sites, among others. These undesirable compounds may be bacterial breakdown products of higher organic compounds, or byproducts of industrial processes.

Hydrogen sulfide $H_2S$, a colorless, toxic gas with a characteristic odor of rotten eggs, is produced in coal pits, gas wells, sulfur springs, and from decaying organic matter containing sulfur. Controlling emissions of this gas, particularly from municipal sewage treatment plants, has long been considered desirable. More recently, protecting electronic apparatus from the corrosive fumes of these compounds has become increasingly important. Further, $H_2S$ is flammable.

Ammonia ($NH_3$), also a colorless gas, possesses a distinctive, pungent odor and is a corrosive, alkaline gas. The gas is produced in animal rooms and nurseries and its control also has long been considered desirable.

Chlorine ($Cl_2$) is a greenish-yellow gas with a suffocating odor. The compound is used for bleaching fabrics, purifying water, treating iron, and other uses. Control of this powerful irritant is most desirable for the well being of those who work with it or are otherwise exposed to it. At lower levels, in combination with moisture, chlorine has a corrosive effect on electronic circuitry, stainless steel and the like.

Formaldehyde (HCHO) is a colorless gas with a pungent suffocating odor. It is present in morgues and anatomy laboratories, and because it is intensely irritating to mucous membranes, its control is desirable.

Urea ($CH_4N_2O$) is present in toilet exhaust and is used extensively in the paper industry to soften cellulose. Its odor makes control of this compound desirable.

Carbon monoxide (CO), an odorless, colorless, toxic gas, is present in compressed breathing air. Oxygenation requirements for certain atmospheres, including those inhabited by humans, mandate its control.

Oxides of nitrogen, including nitrogen dioxide ($NO_2$), nitric oxide (NO), and nitrous oxide ($N_2O$), are compounds with differing characteristics and levels of danger to humans, with nitrous oxide being the least irritating oxide. Nitrogen dioxide, however, is a deadly poison. Control of pollution resulting from any of these oxides is desirable or necessary, depending on the oxide.

Mercaptans and amines, including methyl mercaptan ($CH_3SH$), butyl mercaptan ($C_4H_9SH$) and methyl amine ($CH_5N$), are undesirable gases present in sewerage odor. The control of these gases is desired for odor control.

Ethylene ($C_2H_4$) is a colorless, flammable gas that is a simple asphyxiant which accelerates the maturation or decomposition of fruits, vegetables, and flowers. Control of this compound prolongs the marketable life of such items.

Attempts have been made to provide solid filtration media for removing the undesirable compounds listed above from fluid streams. Desired features of such media are a high total capacity for the removal of the targeted compound, a high efficiency in removing the compound from an air stream contacting the media, and a high ignition temperature (non-flammability).

One specific example of a solid filtration media for the removal of undesirable compounds from gas streams is described in U.S. Pat. No. 4,235,750. The '750 patent discloses an apparatus and method for absorbing ethylene and other gaseous contaminants, wherein the apparatus is a three-part container comprising permanganate impregnated alumina in one compartment, activated carbon in the second compartment, and a mixture of molecular sieves and activated silica gel in the third compartment.

Although the '750 patent discloses a potassium permanganate impregnated alumina for the removal of undesirable compounds from fluid streams, the capacity of the impregnated alumina is limited. The efficiency of the permanganate impregnated alumina of the '750 patent is limited as its optimal concentration of permanganate is 4.5%, and higher concentrations of permanganate results in the clogging of the pores of the substrate and therefore its oxidizing capacity being reduced. Accordingly, this filtration media would be limited to approximately a 9% capacity for the uptake of hydrogen sulfide gas in a gas stream. Therefore, this filtration media could not be efficiently used in small filter beds as larger quantities of the impregnated alumina must be used to compensate for its limited capacity. Further, the use of the impregnated alumina of the '750 patent would be more costly as the media would have to be replaced more frequently, thereby incurring the cost of more frequently purchasing the media and also incurring the cost of the additional labor required for its more frequent replacement. Finally, the permanganate impregnated alumina of the '750 patent is limited in that the failures in the adsorption of contaminants in fluid streams which occur at the end of the useful life of the media would be more frequent due to the limited capacity of the media. Therefore, the media of the '750 patent could not practically be utilized in systems where the air quality is critical.

There are other problems associated with the above described products. One is that they are dusty and may cause irritation to skin, eyes and the respiratory tract. Another problem is that the materials cannot be reused, i.e. they cannot be regenerated. Whatever cannot be saved for recovery or recycling should be handled as hazardous waste. Potassium permanganate in this form is incompatible with organic materials, combustible materials, strong reducing agents, strong acids, peroxides, chemically active metals and may also be toxic to aquatic life.

Another example of a solid oxidizing system in pellet to form consisting of activated alumina ($Al_2O_3$) impregnated with potassium permanganate ($KMnO_4$) is described in U.S. Pat. No. 3,049,399. The pellets disclosed in the '399 patent provide air purification and odor control by both adsorbing and absorbing odors, and then destroy the collected odors by the potassium permanganate's controlled oxidizing action.

The potassium permanganate impregnated alumina pellets of the '399 patent are limited in that they have a limited capacity for removing undesired contaminants from gas streams.

Yet another example of a solid filtration media for removing undesirable compounds from a gas stream is disclosed in U.S. Pat. No. 3,226,332. The '332 patent teaches a method of producing granular activated alumina uniformly impregnated with a solid oxidizing agent, preferably potassium permanganate, for use in treating fluid streams. This method includes the spray addition of the impregnate, wherein the impregnate solution is sprayed onto the dry combination being tumbled in a mixer thereby forming pellets which are later dried to remove a substantial portion of the remaining water.

U.S. Pat. No. 6,004,522 (Purafil) addresses the problems illustrated above, i.e. the need in the prior art by providing a high efficiency, high capacity, low flammability permanganate impregnated substrate for the removal of undesirable contaminants from gas streams. There is disclosed a long lasting filtration media which needs to be replaced less frequently and therefore minimizes maintenance and replacement costs. Also provided by the impregnated substrate of the present invention is a high capacity filtration medium, which may be used in small filter beds, and therefore may allow the treatment of fluid streams where there are significant space limitations.

The filtration media of '522 is claimed to have a higher efficiency and capacity to remove certain undesired compounds from gaseous streams than do the media in the prior art.

However, it still suffers from the disadvantage of using a medium comprising alumina impregnated with potassium permanganate, which is a compound that would be desirable to eliminate, in that it is associated with environmental problems, as indicated above.

It is also desirable to extend the useful life of a filter medium further, beyond the limits of the above prior art media.

Another type of material usable for filtering purposes is so called aerogels. This material has remarkable properties, in terms of extremely low density, high porosity, good thermal insulation capacity. It has been employed in tests for filtering purposes. However, its manufacture in large scale is expensive, and thus it offers no economically feasible alternative to the above discussed media.

In a prior art sol-gel technique, commonly used to produce homogeneous gels and powders with high surface area, e.g. aerogels, an intermediate product is a gel. Gelling involves particles, which are linked together in branched chains that fill the whole volume of the solution so that there is no increase in the concentration of silica in any macroscopic region of the medium, i.e. the silica is uniformly (on a macroscopic level) distributed in the media. Thus, the overall medium becomes viscous and will subsequently be solidified, forming a coherent network of particles, which retains the liquid by capillary action.

EP 0 476 135 A1 discloses an adsorbent which is ammonium ion and ammonia selective and a process for making such adsorbents. The process involves a dropwise addition of water to an aluminium salt or an aluminate and a silicate in alkaline conditions. The reaction mixture is heated and then the pH is adjusted to a pH of 4 to 9 to bring about a precipitation. The product is aged and the product is dried an used as an agent for the adsorption of ammonium ions. This publication does not disclose anything but adsorption of ammonium ions and ammonia. In particular it does not relate to absorption of any other gaseous species than ammonia.

U.S. Pat. No. 3,755,183 discloses a process for making silicate adsorbents and crying agents by forming precipitation products from alkali metal salt solutions of salts containing di- and trivalent metals. The product is based on the use of one metal ion, and the use of the product is for adsorbing oils and moisture.

SUMMARY OF THE INVENTION

In view of the drawbacks associated with prior art materials illustrated above, the object of the present invention is to provide a new material and a method of manufacture thereof, the new material having a performance for filtering applications which is at least as good as that of the prior art materials. The manufacture in large scale should be cheap and simple, as opposed to the often times costly and complicate processes according to the prior art.

This object is achieved in a first aspect of the invention with a method of preparing agglomerates of precipitated silica as defined in claim 1.

In a further aspect, the invention provides a novel material as defined in claim 16.

In particular, the material is environmentally harmless. It can be regenerated, at least in the case where compounds have been physically absorbed, and not chemically bound to the material.

Preferably, the material comprises silicates and divalent metal oxides.

In a third aspect of the invention there is provided a gas filter device, suitable for separating off noxious, or unwanted gaseous components from environmental air. The device is defined in claim 21.

In a fourth aspect a method of filtering air is provided, and defined in claim 22.

Further applications, forming other aspects of the invention, are i.e. use of the material for manufacturing construction materials, use as a fertilizer, to mention a few.

Further scope of applicability of the present invention will become apparent from the detailed description given hereinafter. However, it should be understood that the detailed description and specific examples, while indicating preferred embodiments of the invention are given by way of illustration only. The accompanying drawings are given by way of illustration only.

DETAILED DESCRIPTION OF PREFERRED EMBODIMENTS

The material according to the present invention is made via a precipitation reaction where an alkali silicate solution is brought into contact with a salt solution containing divalent or polyvalent metal cations. When a soluble silicate is mixed with salt solutions containing metals other than those of the alkali group, insoluble amorphous metal silicates are precipitated. This process can be characterized as a coagulation process, where the particles come together into relatively close-packed aggregates in which the silica is more concentrated than in the original solution, such that the coagulum settles as a relatively dense precipitate.

The precipitated coagulum obtained as described above is then rinsed in water until the residual reaction products and excess ingredients have been removed. This slurry is then dewatered by means of vacuum or centrifugal filtration until a fairly stiff paste of about 15% dry matter is obtained.

For embodiments where the material should be impregnated, as will be described in further detail below such impregnation can be achieved by a final rinse of the coagulum with a solution containing the required impregnation chemicals and at a proper concentration. Unless impregnation is done in conjunction with the final rinse, the required chemicals may be added and mixed with the paste after the final rinse and dewatering step.

For embodiments where the material is preferably in pellet form, such pellets are produced using standard paste extrusion equipment and if spherical particles or particles with rounded shape are required the pellets may subsequently be spheronised/marumerised in a separate step. Finally, the material obtained need to be dried either in a fluidized bed or in a rotary drier, or any other conventional and suitable drying equipment, whereby shaping and drying the impregnated coagulum to a dry matter content of >75%, preferably >90%, more preferred >95%, most preferred >97% is carried out.

Thus in summary, the desired material is formed as a precipitate by mixing alkali silicate with a salt solution, and the precipitate is processed in various ways to obtain the desired end product.

Alkali silicates suitable for the purposes of the present invention are available in different types depending on the alkali metal involved and the molar ratio of the main constituents of alkali silicate, namely, $SiO_2$, and in the case of sodium silicate, $Na_2O$. Commercial alkali silicates are supplied in molar ratios between 3.9 and 1.6. The most common alkali silicate is based on sodium, Na, but also potassium, K, and to some extent lithium, Li. Such products are available from Askania in Göteborg, Sweden.

To obtain the coagulation reaction, a dilute alkali silicate solution, typically at 1.5 M concentration with respect to $SiO_2$, is mixed with a concentrated or even saturated solution of Mg- and/or Ca-salts. The most readily available salts for this purpose are $MgCl_2$ and $CaCl_2$, respectively. However, any easily dissolvable salt such as nitrates and acetates are possible to use according to the invention. Even though Mg and Ca are the most accessible cations, also other divalent and polyvalent ions may be used, such as Cu, Zn, Mn, Cd, Pb, Ni, Fe, Cr, Ag, Al, Ti, V, Co, Mo, Sn, Sb, Sr, Ba and W.

When a dilute solution of sodium silicate is mixed with Mg- and/or Ca-chloride under heavy stirring the mixture coagulates immediately. The reaction is assumed to occur according to the following reaction formula:

$$Na_2O \cdot nSiO_2(l) + \tfrac{1}{2}Mg^{2+} + \tfrac{1}{2}Ca^{2+} \rightarrow (Mg,Ca)O \cdot n SiO_2(s) + 2Na^+ \quad (1)$$

where n denotes the molar ratio of $SiO_2$ to $Na_2O$. Reaction formula (1) suggests that the amount of Mg and Ca in the final product is governed by this molar ratio n (i.e $SiO_2/Na_2O$). The lower the ratio, the more Mg and Ca will be present in the coagulum relative to the $SiO_2$-content. In other words, to maximize the contents of Mg and Ca in the reaction product, an alkali silicate with as low molar ratio n as possible should be employed.

The Mg- and Ca-enriched silica particles are coagulated as loose aggregates in the aqueous medium, recovered on a filter, washed, shaped and dried as described earlier. In this condition, the precipitated silica produced may be used as an absorbent for certain types of contaminant gases by its inherent affinity for these gas molecules. Some examples of possible reaction formulas are shown below for the active sites of the medium:

$$(Mg,Ca)O(s) + SO_2(g) + \tfrac{1}{2}O_2(g) \rightarrow (Mg,Ca)SO_4(s) \quad (2)$$

$$(Mg,Ca)O(s) + CO_2(g) \rightarrow (Mg,Ca)CO_3(s) \quad (3)$$

$$(Mg,Ca)O(s) + H_2S(g) \rightarrow (Mg,Ca)S(s) + H_2O(g) \quad (4)$$

Thus, a micro-porous material is provided, comprising agglomerates of precipitated silica, according to the formula $$MeO_x \cdot mSiO_2$$

wherein

Me denotes any metal or arbitrary mixture of metals among Ca, Mg, Cu, Zn, Mn, Cd, Pb, Ni, Fe, Cr, Ag, Al, Ti, V, Co, Mo, Sn, Sb, Sr, Ba and W, and wherein x denotes the molar ratio of oxygen to metallic constituents, and wherein m denotes the molar ratio of Si/Me, and wherein the agglomerates are composed of porous particles, said agglomerates exhibiting a size in the range 0.5-500 μm, preferably 5-200 μm, most preferred 10-100 μm.

The micro-porous material according to the invention will have a molar ratio, m=Si/Me, is in the range 1-4, preferably 2-3.5, most preferred 2.5-3.

The micro-porous material according to the invention when exposed to saturated water vapour as well as liquid water does not disintegrate or dissolve.

The micro-porous material according to the invention suitably is impregnated to a level of impregnation agents of 0-20%, preferably 5-20%, more preferred 10-20%.

In order to enhance the efficiency of the filter medium, additional substances may be incorporated in the medium. These substances may either act as catalysts and pH-buffers or as trapping agents for specific gas components. Examples of such chemicals and gases are shown in Table 1. By "VOC" we mean all organic compounds (substances made up of predominantly carbon and hydrogen) with boiling temperatures in the range 50-260° C., excluding pesticides, a definition that complies with that of the World Health Organisation

TABLE 1

Impregnation agents usable for trapping specific gaseous contaminants.

| Active impregnant | Formula | Captured gas contaminant |
|---|---|---|
| Potassium hydroxide | KOH | $SO_2$, $SO_3$, $HNO_3$, HCl, VOC |
| Potassium iodide | KI | $H_2S$, $NO_2$ |
| Potassium permanganate | $KMnO_4$ | $SO_2$, HCHO, NO, VOC |
| Oxalic acid | $C_2H_2O_4$ | $NH_3$ |
| Citric acid | $C_6H_8O_7$ | $NH_3$ |
| Sodium thiosulfate | $Na_2S_2O_3$ | $Cl_2$ |
| Sodium hypochlorite | NaClO | $H_2S$ |
| Potassium carbonate | $K_2CO_3$ | HCl, HF |
| Sodium carbonate | $Na_2CO_3$ | HCl, HF |

Example

Preparation of an Impregnated Filter Medium Suitable for Filtering $SO_2$ Contaminated Air Solutions were made from water having no special degree of purity. Rinsing/washing was performed with ordinary tap water.

Alkali silicates were obtained i.e. from Askania, Göteborg, Sweden, salts from retailers of agricultural chemicals, although other sources are also available. The compounds were essentially bulk chemicals, except for doping/impregnating chemicals, which were of a higher degree of purity. The latter generally came from VWR in Sweden. This demonstrates that the process can be up-scaled using cheap bulk chemicals which are readily available in most markets around the world.

The filter media tested as described below were made by the following general procedure (volumes, concentration and molar ratios vary between batches).

1. Solutions of either pure 1.5 M $MgCl_2$ or pure 1.5 M $CaCl_2$ was used, or mixtures of said solutions in ratios indicated in Table 4 (i.e. 0.5 litre or 0.65 litres of 1.5 M $MgCl_2$ was mixed with 0.5 litre or 0.35 litres, respectively of 1.5 M $CaCl_2$).
2. 1 litre of 1.5M (with respect to $SiO_2$) sodium silicate having a molar ratio of 1.6 or 3.35 was made and placed in an ordinary food mixer.
3. Salt solution(s) was/were poured into the silicate solution while the mixer was running, whereby the solution immediately began to coagulate.
4. The precipitated coagulum was allowed to settle for up to an hour and the clear liquid above the precipitate was removed by decanting.
5. The precipitate was rinsed by adding fresh water followed by stirring of the solution and allowing the coagulum to settle before decanting. This procedure was repeated a number of times until the decanted water was virtually free from chloride ions, as detected by adding a few drops of dilute $AgNO_3$ reagent.
6. After the final rinse, fresh water was again added to the precipitate and this solution was vacuum filtered through a filter paper until a dry matter level of about 15% had been attained.
7. Impregnation chemicals (KOH, and KI) were added to the coagulum cakes or pastes, respectively, in the form of powders or crystals, which subsequently were dissolved in the remaining (85%) water phase of the coagulum under thorough stirring.
8. The coagulum pastes were then pelletized, spheronised and dried at a temperature of 105° C. until less than 3% by weight free water was left.
9. The filter media were passed through sieves to get a bead size of about 4 mm.

The above described procedure is performed in laboratory scale. In an industrial facility, of course suitable process equipment would be used. E.g. for the filtering one would suitably use a filter press type of apparatus, or some other dewatering equipment. Centrifuges could be a feasible alternative.

This process yielded a material exhibiting the following properties:

Molar ratio Si/Me is in the range 1-4, preferably 2-3.5, most preferred 2.5-3, where Me denotes any metal or arbitrary mixture of metals among Ca, Mg, Cu, Zn, Mn, Cd, Pb, Ni, Fe, Cr, Ag, Al, Ti, V, Co, Mo, Sn, Sb, Sr, Ba and W.

Porosity of the material is 0.2-1.5 $cm^3/g$, preferably 0.5-1.2 $cm^3/g$ BET surface is 20-800 $m^2/g$, preferably 300-800 $m^2/g$.

The material consists of small porous particles agglomerated into aggregates with a size in the range 0.5-500 µm, preferably 5-200 µm, most preferred 10-100 µm.

Impregnation of Material

In order to ascertain a high level of absorption of the filter medium, impregnation was performed. Impregnation tests have been conducted using some of the chemicals listed in Table 1. Two media, one containing 5% KOH, and the other 5% KI, were produced according to the description above.

Test for Absorptive Capacity

Figure 3:
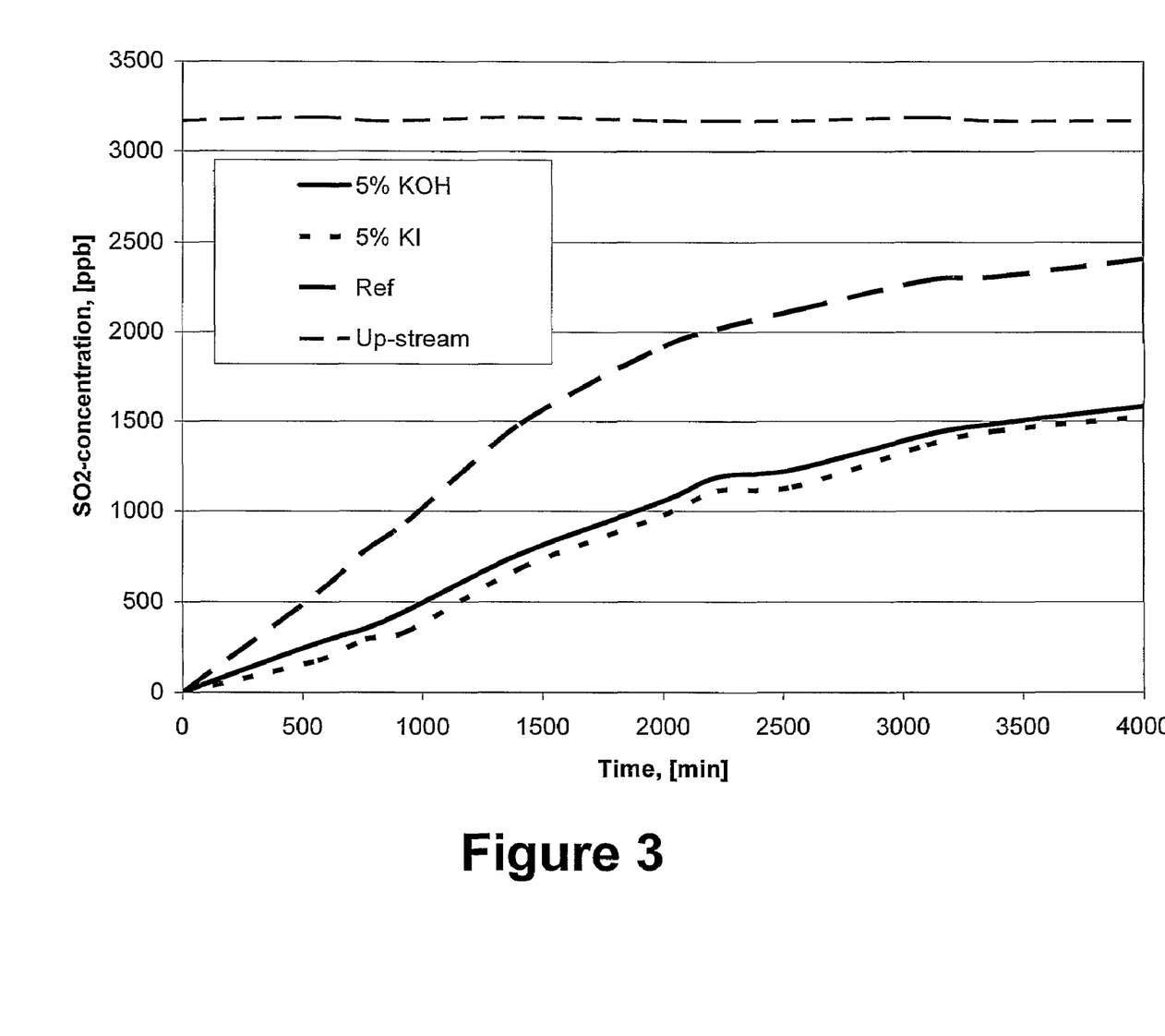
FIG. 3 is a comparison of $SO_2$ adsorption for two impregnated media representing the invention, containing 5% KOH and KI, respectively, with a reference medium made of alumina impregnated with 8% $KMnO_4$ and some $NaHCO_3$.

A commercial filter medium (Purafil) suitable for removal of $SO_2$, consisting of alumina impregnated with 8% $KMnO_4$ and a certain amount of $NaHCO_3$ was used as the reference material. Absorption tests were conducted in a test rig with parallel filter columns through which air contaminated with about 3.2 ppm of $SO_2$ was made to pass. The length of the test bed was 26 mm, the flow rate of the contaminated air was 30 l/min and the contact time was close to 0.1 s. The relative humidity varied between 50 and 58% during the course of the test. The concentration of $SO_2$ was measured up-stream of the filters and directly after each filter column.

The results of the adsorption tests are shown in FIG. 3, in which the upper essentially horizontal curve (- - - -) represents the concentration of $SO_2$ (about 3200 ppb) in incoming testgas, i.e. in a position "upstream" with respect to the filter. The uppermost curve (———) of the three curves representing measurements after the filter is from the commercial reference filter medium (Purafil), and the two lower curves (——— and • • • • • • • • • respectively) represent the result using the filter according to the invention.

The results in FIG. 3 show that the two media made according to the present invention out-performs the reference material. The time to reach a certain leakage of $SO_2$ was about two times longer for the filter media described by this invention, as compared with the reference material.

In a similar test to that shown in FIG. 3 the absorbed amount of $SO_2$ was measured when the degree of separation exceeded 50% for Purafil (8% $KMnO_4$) and the material of present invention containing 8% KOH. The absorbed amount of $SO_2$ for the commercial material was in the range 200-225 mg whereas the material according to the invention had absorbed between 750 and 800 mg. This means that the product of present invention has an absorptive capacity of more than 3 times that of Purafil.

Thus, the material according to the invention preferably has an absorptive capacity for $SO_2$ of at least 5 mg/ml, preferably more 10 mg/ml, most preferably more than 15 mg/ml, and up to as much as 25 mg/ml.

Expressed differently, the material according to the invention can absorb up to 7% of its own weight, suitably up to 12% and maximum 20% as $SO_2$.

Comment: on a closer look the capacity is different for different gases, for chemical reasons, but also depending on the molar weight. Furthermore the capacity is affected by the testing conditions, e.g. air flow, contact time etc. Therefore it is difficult to mention general numbers. The Purafil material has a capacity of 7% with respect to $SO_2$. Based on this, suitable levels for the invention have been found that will achieve a reasonable capacity.

It should be noted that the graphs represent a test situation only. In actual operation, the measured concentration after the filter would of course be 0 for a significant time, before "break-through", i.e. when the filter begins to leak out contaminants at the output end.

Carrier Material

The surface and pore properties of various types and forms of silica carrier material are critical determinants of their possible application as absorbents for gaseous contaminants. Various mixtures of precipitated silicas, prepared according to the procedure described previously, have been evaluated for their BET surface area ($m^2/g$) and total pore volume ($cm^3/g$). In Tables 2 and 3 the results of such tests are shown.

TABLE 2

Sodium silicate, molar ratio 3.35, precipitated with mixtures of Ca-and/or Mg-chloride. All solutions were of concentration 1.5 M as described previously.

| Ca, atom-% | BET, $m^2/g$ | Pore volume, $cm^3/g$ | Mg, atom-% |
|---|---|---|---|
| 0 | 356 | 0.6 | 100 |
| 35 | 532 | 0.7 | 65 |
| 100 | 57 | 0.25 | 0 |

TABLE 3

Potassium silicate, molar ratio 3.35, precipitated with mixtures Ca-and/or Mg-nitrate All solutions were of concentration 1.5 M as described previously.

| Ca, atom-% | BET, $m^2/g$ | Pore volume, $cm^3/g$ | Mg, atom-% |
|---|---|---|---|
| 0 | 277 | 0.4 | 100 |
| 35 | 293 | 0.41 | 65 |
| 100 | 63 | 0.23 | 0 |

From Tables 2 and 3 can be seen that precipitates made with Ca-salts have relatively low specific (BET) surface area whereas the corresponding precipitates made with Mg-salts show significantly higher BET surface area. It may also be noted that for the mixture containing 65% Mg and 35% Ca the resulting precipitate had an even higher BET surface area than the mixtures containing the single salts. The pore volumes of the tested samples follow the same pattern, as does the specific surface area. These effects seem to be independent of the type of alkali silicate employed or which anion is present in the salt.

Below are additional results of BET-measurements for precipitates formed out of sodium silicate at one more level of salt concentration, at two levels of the molar ratio and two levels of the salt concentration. Finally, the significance of the mixing order was also studied, i.e., if the salt was present in the mixer while the silicate was poured into the mixture, or vice versa.

TABLE 4

BET surface area and pore volume for various filter media made from sodium silicate (1.5M $SiO_2$) molar ratio 3.35 and 1.6, respectively, precipitated with Ca- and/or Mg-chloride, 1.5M as well as saturated solutions.

| Sample-ID | Molar ratio | Ca, atom-% | Mg, atom-% | Salt conc. | In mixer | BET, $m^2/g$ | Pore volume, $cm^3/g$ |
|---|---|---|---|---|---|---|---|
| V-1 | 3.35 | 0 | 100 | 1.5M | Salt | 346 | 0.62 |
| V-7 | 3.35 | 0 | 100 | 1.5M | silicate | 347 | 0.61 |
| V-5 | 3.35 | 35 | 65 | 1.5M | Salt | 346 | 0.51 |
| V-6 | 3.35 | 35 | 65 | 1.5M | silicate | 391 | 0.52 |
| V-3 | 3.35 | 50 | 50 | 1.5M | Salt | 245 | 0.54 |
| V-4 | 3.35 | 50 | 50 | 1.5M | silicate | 291 | 0.5 |
| V-2 | 3.35 | 100 | 0 | 1.5M | Salt | 69.7 | 0.31 |
| V-8 | 3.35 | 100 | 0 | 1.5M | silicate | 63.8 | 0.22 |
| VI-1 | 3.35 | 0 | 100 | saturated | Salt | 383 | 0.71 |
| VI-2 | 3.35 | 0 | 100 | saturated | silicate | 439 | 0.78 |
| VI-6 | 3.35 | 55 | 45 | saturated | Salt | 359 | 0.47 |
| VI-5 | 3.35 | 55 | 45 | saturated | silicate | 323 | 0.47 |
| VI-4 | 3.35 | 100 | 0 | saturated | Salt | 77.8 | 0.31 |
| VI-3 | 3.35 | 100 | 0 | saturated | silicate | 56.8 | 0.26 |
| VII-1 | 1.6 | 0 | 100 | saturated | Salt | 380 | 0.43 |
| VII-2 | 1.6 | 0 | 100 | saturated | silicate | 377 | 0.41 |
| VII-5 | 1.6 | 55 | 45 | saturated | Salt | 365 | 0.45 |
| VII-6 | 1.6 | 55 | 45 | saturated | silicate | 232 | 0.38 |
| VII-3 | 1.6 | 100 | 0 | saturated | Salt | 41.4 | 0.18 |
| VII-4 | 1.6 | 100 | 0 | saturated | silicate | 49.2 | 0.2 |

Figure 1:
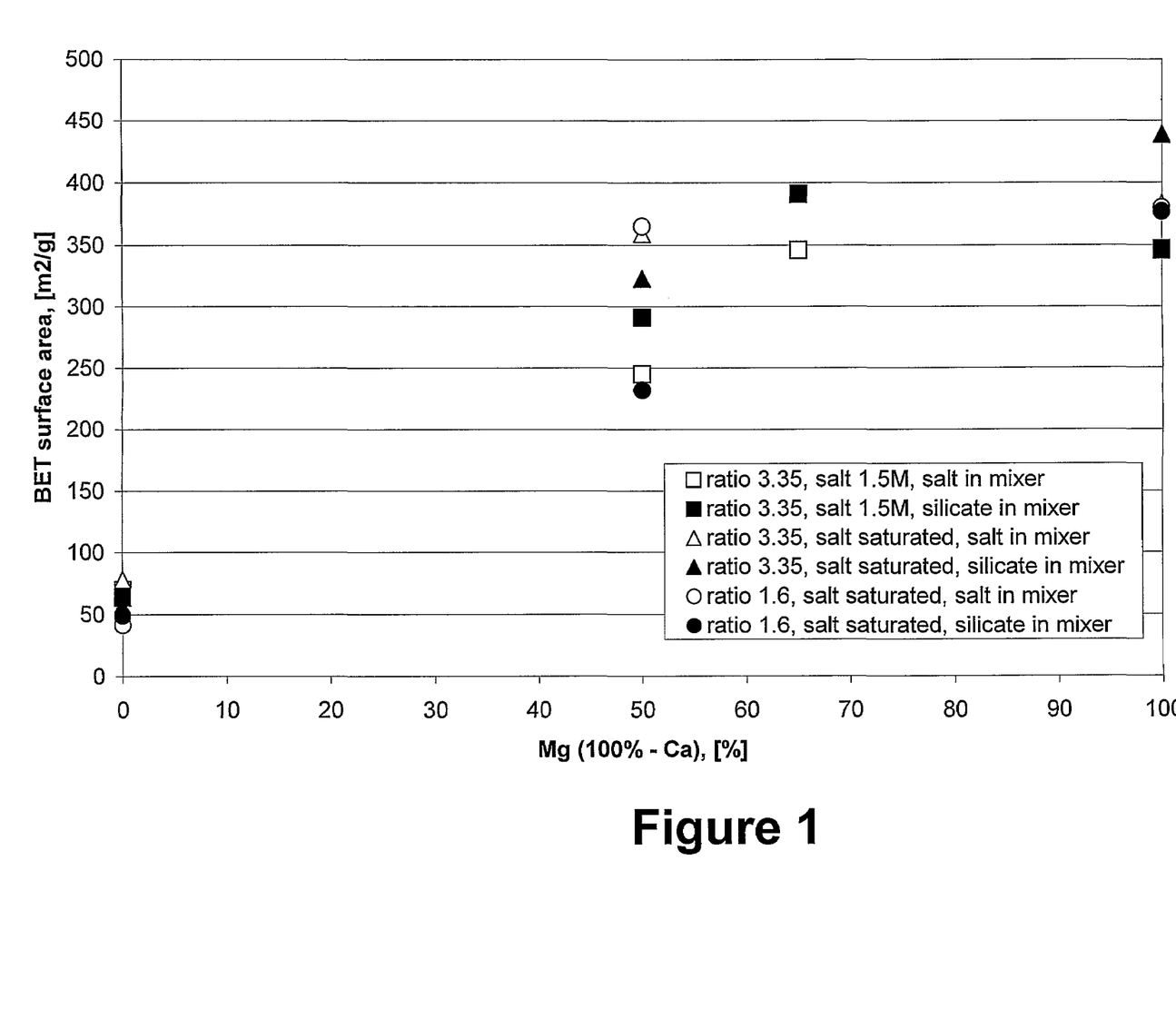
FIG. 1 shows BET surface area measured for various samples of filter media, from Table 4.
Figure 2:
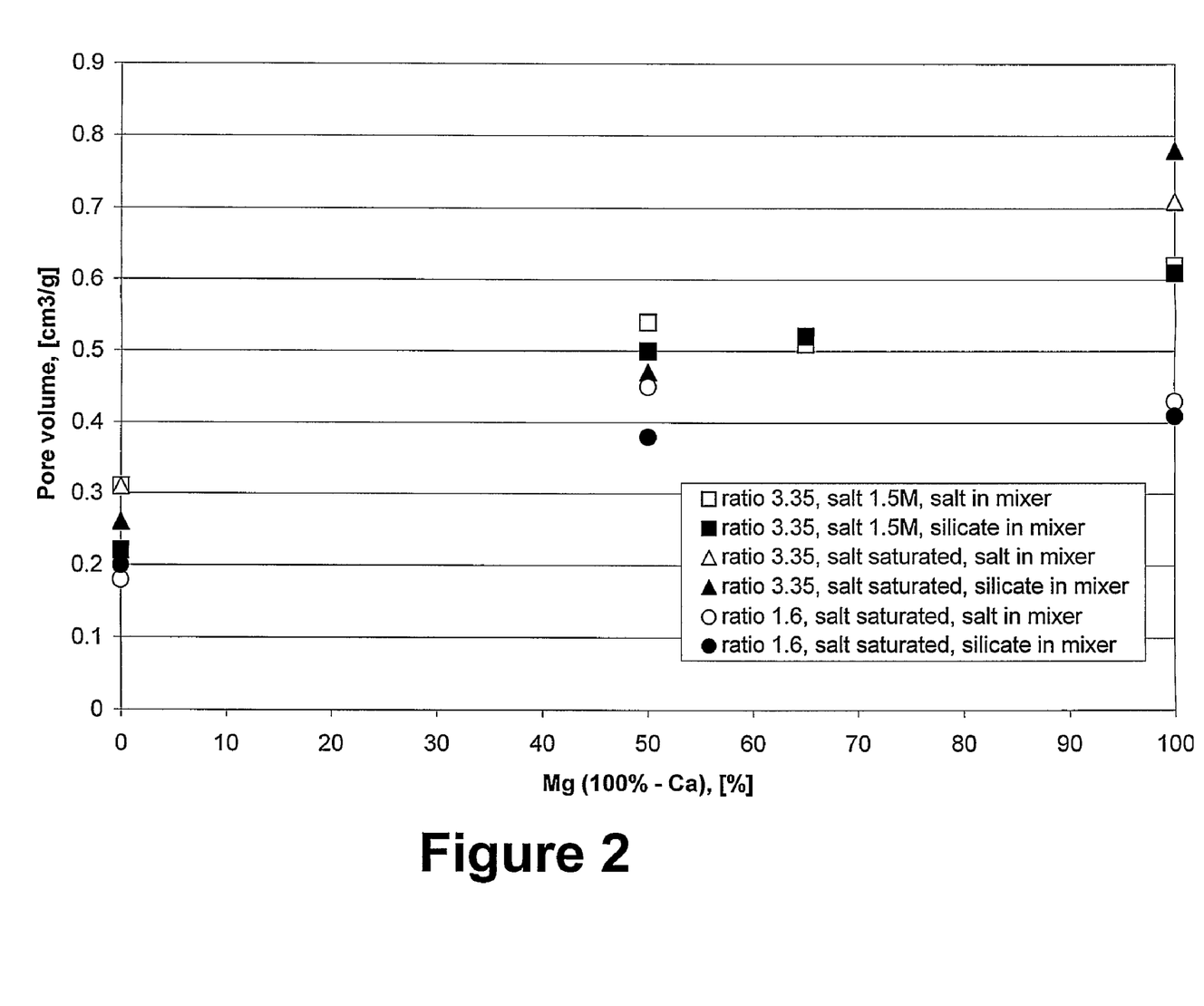
FIG. 2 shows pore volume obtained for various samples of filter media, from Table 4.

FIGS. 1 and 2 show the corresponding data in graphical form.

The optimum in BET surface area and pore volume seen in Tables 2 and 3 for mixtures of Mg and Ca are not that obvious as judged from Table 4 and FIGS. 1 and 2. It appears that a relatively high BET surface area and pore volume result if the Mg-content exceeds about 50%. The possible influence of molar ratio, salt concentration and mixing order has not been observed in the results obtained. None of these aspects seem to have any significant impact on the studied properties.

Chemical analyses of a wide range of samples have been done using a Scanning Electron Microscope, SEM, fitted with an energy dispersive detector for elemental analysis. The analysis of Si, Mg and Ca were done in order to see if the molar ratio of the silicate solution has an impact on the amount of Mg and Ca found in the precipitate, as given by the reaction formula (1).

TABLE 5

Chemical composition of filter media in relation to the procedures and ingredients used, sodium silicate (1.5M $SiO_2$) molar ratio 3.35 resp 1.6, precipitated with Ca- and/or Mg-chloride, 1.5M as well as saturated solutions.

| | Pre-mixing conditions | | | | Chemical composition of filter media, atom-% | | | |
|---|---|---|---|---|---|---|---|---|
| Sample ID | Molar ratio | Ca, atom % | Mg, atom % | In mixer | Si | Mg | Ca | Si/(Mg + Ca) |
| V-1 | 3.35 | 0 | 100 | Salt | 24.5 | 7.1 | 0.15 | 3.4 |
| V-7 | 3.35 | 0 | 100 | Silicate | 24.9 | 7.1 | 0.15 | 3.4 |

TABLE 5-continued

Chemical composition of filter media in relation to the procedures and ingredients used, sodium silicate (1.5M SiO$_2$) molar ratio 3.35 resp 1.6, precipitated with Ca- and/or Mg-chloride, 1.5M as well as saturated solutions.

| Sample ID | Pre-mixing conditions | | | | Chemical composition of filter media, atom-% | | | |
|---|---|---|---|---|---|---|---|---|
| | Molar ratio | Ca, atom % | Mg, atom % | In mixer | Si | Mg | Ca | Si/(Mg + Ca) |
| V-5 | 3.35 | 35 | 65 | Salt | 23.8 | 6 | 1.7 | 3.1 |
| V-6 | 3.35 | 35 | 65 | Silicate | 19.9 | 5 | 5.7 | 1.9 |
| V-3 | 3.35 | 50 | 50 | Salt | 21.6 | 4.8 | 5.4 | 2.1 |
| V-4 | 3.35 | 50 | 50 | Silicate | 23.8 | 5.1 | 3.9 | 2.6 |
| V-2 | 3.35 | 100 | 0 | Salt | 19.4 | 0 | 8.3 | 2.3 |
| V-8 | 3.35 | 100 | 0 | Silicate | 21.7 | 0.03 | 7.6 | 2.8 |
| VI-1 | 3.35 | 0 | 100 | Salt | 23.2 | 7.8 | 0.13 | 2.9 |
| VI-2 | 3.35 | 0 | 100 | Silicate | 22.8 | 8 | 0.16 | 2.8 |
| VI-6 | 3.35 | 55 | 45 | Salt | 22.6 | 5.6 | 3.2 | 2.6 |
| VI-5 | 3.35 | 55 | 45 | Silicate | 20.7 | 5.5 | 1.5 | 3.0 |
| VI-4 | 3.35 | 100 | 0 | Salt | 22.1 | 0.04 | 10.3 | 2.1 |
| VI-3 | 3.35 | 100 | 0 | Silicate | 21.5 | 0.04 | 9.4 | 2.3 |
| VII-1 | 1.6 | 0 | 100 | Salt | 20.4 | 11.2 | 0.13 | 1.8 |
| VII-2 | 1.6 | 0 | 100 | Silicate | 20.6 | 11.2 | 0.16 | 1.8 |
| VII-5 | 1.6 | 55 | 45 | Salt | 18.8 | 8 | 3.6 | 1.6 |
| VII-6 | 1.6 | 55 | 45 | Silicate | 20.3 | 8 | 3.3 | 1.8 |
| VII-3 | 1.6 | 100 | 0 | Salt | 16.6 | 0.03 | 13.2 | 1.3 |
| VII-4 | 1.6 | 100 | 0 | Silicate | 16.7 | 0.05 | 12.8 | 1.3 |

From Table 5 it is clear that the lower the molar ratio in the alkali metal silicate is, the lower the ratio between Si and the sum of Mg and Ca will be in the finished product. In other words, to get a higher proportion of Mg and Ca in the coagulum and in the finished product, an alkali silicate having a low molar ratio should be used. This is in accordance with reaction formula (1) shown previously. This is an important feature of the invention since it governs the amount of gas contaminants that may be absorbed, according to the reaction formulas (2)-(4).

As can be understood from the above disclosed experiments, the novel material is thus usable as a gas filter medium for removing noxious or other unwanted gases, such as $CO_2$ from ambient air or from other contaminated atmospheres. The material can be incorporated into any device, equipment or apparatus where filter media according to prior art already is used.

The stability of filter media, while soaked in water, is a common and strong demand from the filter industry since condensation phenomena can occur under certain operating conditions as well as during storage. In order to find out the upper limit for the addition of impregnation chemicals to the carrier a series of tests involving material made from sodium silicate with molar ratio of both 1.6 and 3.35 was designed. The filter material was made from a mixture of Ca and Mg salts as described earlier. Potassium hydroxide, KOH, was added up to 24% by weight for both types. After drying at 105° C., the filter pellets were soaked in distilled water. The pH of the water was tested using phenolphthalein indicator solution as well as pH indicator paper. The physical stability of the filter pellets was also observed visually during testing. The results are shown in Table 6.

TABLE 6

Testing for water stability by soaking filter pellets in distilled water. Impregnation with KOH up to 24% by weight. Y = Yes, the filter pellets disintegrates, N = No, the filter pellets remain intact.

| Molar ratio | 0 | 5 | 8 | 12 | 16 | 20 | 24 |
|---|---|---|---|---|---|---|---|
| 1.6 | Y | Y | Y | Y | Y | Y | Y |
| 3.35 | N | N | N | N | N | Y | Y |

The disintegration of the filters as shown in Table 6 was always accompanied by an increased pH-value indicating the release of KOH into the water. The filter medium made from sodium silicate with molar ratio 1.6 was not stable for any level of impregnation and not even the carrier as such was stable in water. The filter material made from sodium silicate with molar ratio 3.35, on the other hand, showed a surprisingly high stability even at high impregnation levels or close to 20% KOH.

Thus, preferably the process of making the material according to the invention entails using a molar ratio of silicate/alkali metal oxide (e.g $SiO_2/Na_2O$) of 1-4, preferably, 2-3.7, most preferably about 3.2-3.7, such as 3.35.

When the material is exhausted, i.e. its capacity to absorb contaminants has reached the limit, the material can be reused as a filter medium after regeneration, provided that the contaminants are only physically absorbed and not chemically bound. Regeneration can be performed by simple heating or by a displacement process by purging with some inert gas or a combination of the two.

In cases where the contaminants are chemically bound, and per se are not toxic or other wise pose a hazard, the material can be used in construction materials, either as it is or in combination with various types of binders, including cement etc.

The material can even be used as a fertilizer, possibly in combination with other compounds. Additional compounds rich in P, phosphorus and N, nitrogen may be combined with the residual filter medium to give required amounts and appropriate balance with regard to primarily N, P, K, Ca, Mg and S.

The invention claimed is:

1. A method of preparing agglomerates of precipitated silica comprising the following steps:
    preparing a solution of at least two metal salts (Me), wherein the metal ions are divalent or polyvalent;
    preparing a solution of alkali metal (M) silicate having a molar ratio $SiO_2/M_2O$ of 1-4;
    mixing said solutions and stirring the mixture whereby a coagulum immediately forms;
    rinsing the coagulum in water;
    collecting the coagulum;
    impregnating the coagulum with impregnation chemicals selected from the group consisting of $KMnO_4$, $C_2H_2O_4$, $C_6H_8O_7$, $Na_2S_2O_3$, NaClO, KOH, NaOH, KI, NaI, $K_2CO_3$, $Na_2CO_3$, $NaHCO_3$, and $KHCO_3$;
    processing the coagulum to provide a dry matter content of >15; and
    shaping and drying the impregnated coagulum to a dry matter content of >75%.

2. The method as claimed in claim 1, wherein the alkali metal (M) is Na, K, or Li.

3. The method as claimed in claim 1, wherein the metal salts comprise two or more metals selected from the group consisting of Mg, Ca, Cu, Zn, Mn, Cd, Pb, Ni, Fe, Cr, Ag, Al, Ti, V, Co, Mo, Sn, Sb, Sr, Ba and W.

4. The method as claimed in claim 3, wherein the anion in said salt(s) is any ion that forms an easily dissolvable salt with the metal.

5. The method as claimed in claim 1, wherein said metal salt solutions have a concentration in a range from 0.5 M and up to saturated solutions.

6. The method as claimed in claim 1, wherein said alkali metal silicate solution has a concentration with respect to $SiO_2$ of more than 0.5 M and less than 4 M.

7. The method as claimed in claim 1, wherein the processing of the coagulum comprises rinsing to remove free anions.

8. The method as claimed claim 1, wherein the processing of the coagulum comprises drying to the desired dry matter content at a temperature of about 50-250° C.

9. The method as claimed in claim 1, wherein impregnation is performed by adding and mixing said compounds to the coagulum before drying.

10. The method as claimed in claim 9, wherein the impregnation chemicals are selected from KOH and KI, and are added to the coagulum cake or paste in the form of powders or crystals, which subsequently are dissolved in the remaining water phase of the coagulum under thorough stirring.

11. The method as claimed in claim 1, comprising impregnating the coagulum with selected compounds by adding said selected compounds to a final rinsing step before drying.

12. The method as claimed in claim 1, wherein the processing of the coagulum comprises dewatering the material before drying, suitably in a filter press type of device or in a centrifuge.

13. The method as claimed in claim 1, wherein the processing of the coagulum comprises pelletizing the material before drying.

14. The method as claimed in claim 13, wherein the pelletized material is spheronised and/or marumerised.

* * * * *